(12) United States Patent
Benz et al.

(10) Patent No.: US 9,919,487 B2
(45) Date of Patent: Mar. 20, 2018

(54) MANDREL FOR HOLDING AN INTRAOCULAR LENS BLANK AND METHOD OF MAKING AN INTRAOCULAR LENS USING THE SAME

(71) Applicant: Benz Research and Development Corporation, Sarasota, FL (US)

(72) Inventors: Patrick H. Benz, Sarasota, FL (US); Andrew Larson, Sarasota, FL (US)

(73) Assignee: Benz Research and Development Corporation, Sarasota, FL (US)

( * ) Notice: Subject to any disclaimer, the term of this patent is extended or adjusted under 35 U.S.C. 154(b) by 0 days.

(21) Appl. No.: 14/786,836

(22) PCT Filed: Apr. 22, 2014

(86) PCT No.: PCT/US2014/034935
§ 371 (c)(1),
(2) Date: Oct. 23, 2015

(87) PCT Pub. No.: WO2014/176230
PCT Pub. Date: Oct. 30, 2014

(65) Prior Publication Data
US 2016/0101579 A1    Apr. 14, 2016

Related U.S. Application Data

(60) Provisional application No. 61/815,663, filed on Apr. 24, 2013.

(51) Int. Cl.
B29D 11/00        (2006.01)
B29D 11/02        (2006.01)
(Continued)

(52) U.S. Cl.
CPC .......... *B29D 11/00942* (2013.01); *B23C 3/00* (2013.01); *B23Q 3/086* (2013.01); *B29D 11/023* (2013.01)

(58) Field of Classification Search
CPC . B23C 2215/40; B23C 3/00; B29D 11/00942; B23Q 3/086
See application file for complete search history.

(56) References Cited

U.S. PATENT DOCUMENTS 3,951,203 A      4/1976 Prunier
2004/0002290 A1  1/2004 Green
(Continued)

OTHER PUBLICATIONS

International Search Report and Written Opinion dated Aug. 21, 2014 in PCT/US2014/034935 (10 pgs.).

*Primary Examiner* — Alan Snyder
(74) *Attorney, Agent, or Firm* — Foley & Lardner LLP

(57) ABSTRACT

A mandrel (300) for holding an intraocular lens blank (200) during manufacturing includes an intraocular lens holding section configured to hold an intraocular lens, the intraocular lens holding section including: a central cavity (310) configured to hold a mounting material (315) such that the mounting material contacts an optic of the intraocular lens blank when the intraocular lens blank is mounted on the mandrel, and a projection (325) extending around a periphery of the central cavity, the projection having an outer wall (330) and an inner wall (335), and the projection being configured such that an outer peripheral edge of the intraocular lens blank extends up to or beyond the projection when the intraocular lens blank is mounted on the mandrel. A second mounting material (320) is deposited in the first trench (340) and then the haptic is milled using e.g. an end mill (365).

27 Claims, 10 Drawing Sheets

(51) Int. Cl.
 *B23C 3/00* (2006.01)
 *B23Q 3/08* (2006.01)

(56) References Cited

U.S. PATENT DOCUMENTS

2011/0037184 A1\* 2/2011 Shoji ..................... A61L 27/00
 264/1.36
2011/0124272 A1\* 5/2011 Felten ................ B24B 13/0057
 451/42

\* cited by examiner

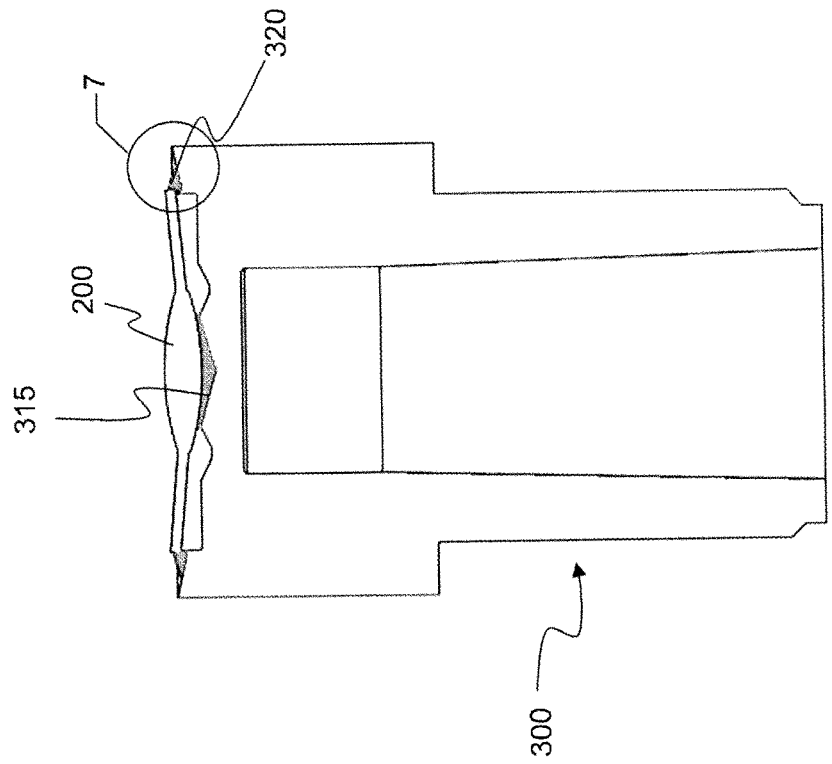
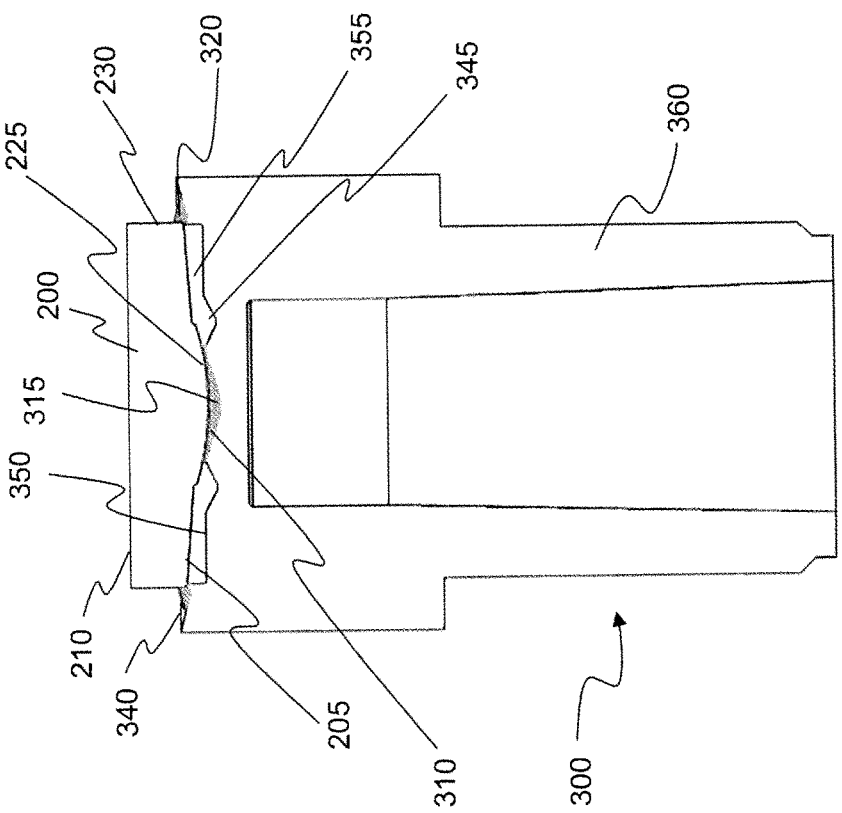
FIG. 5

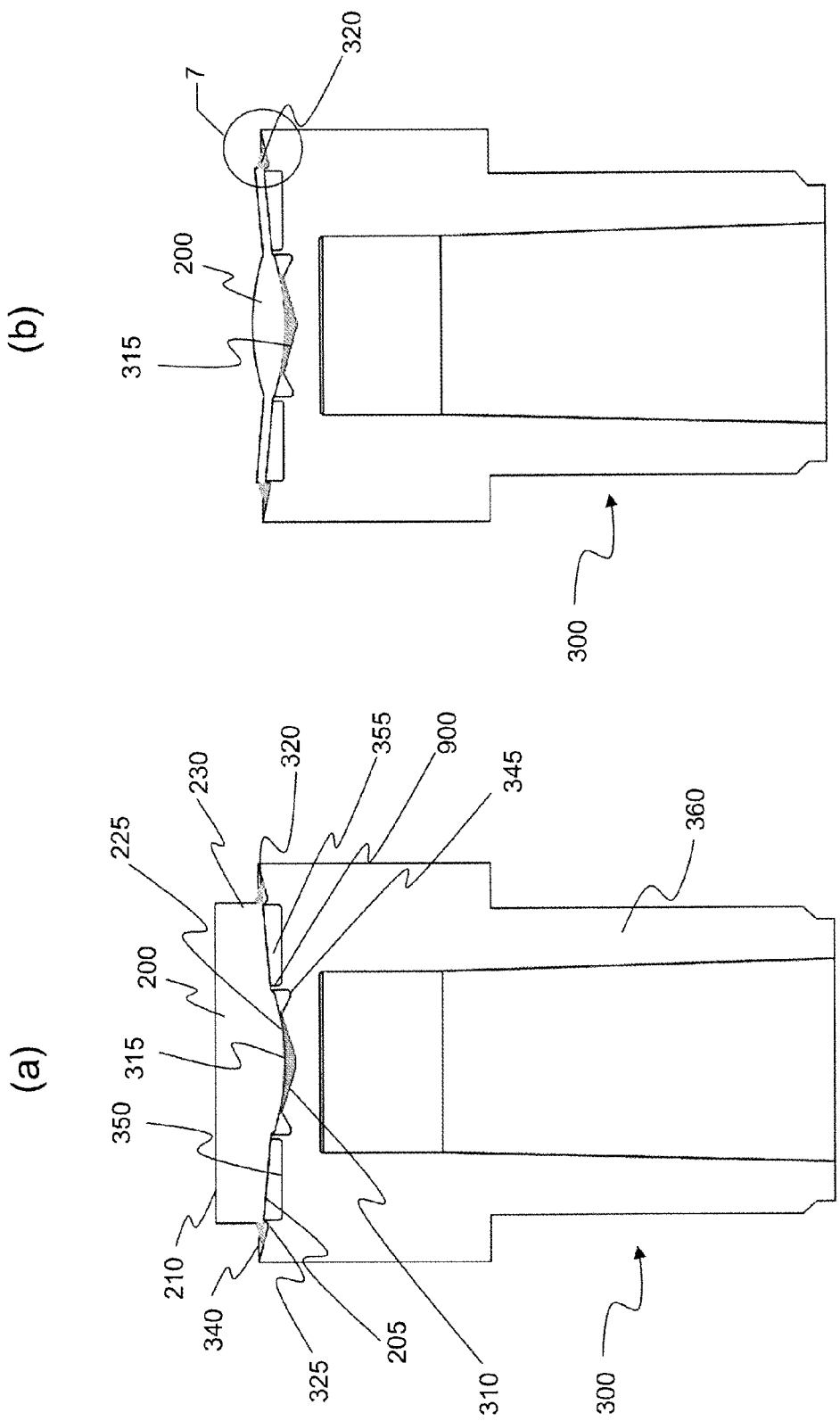

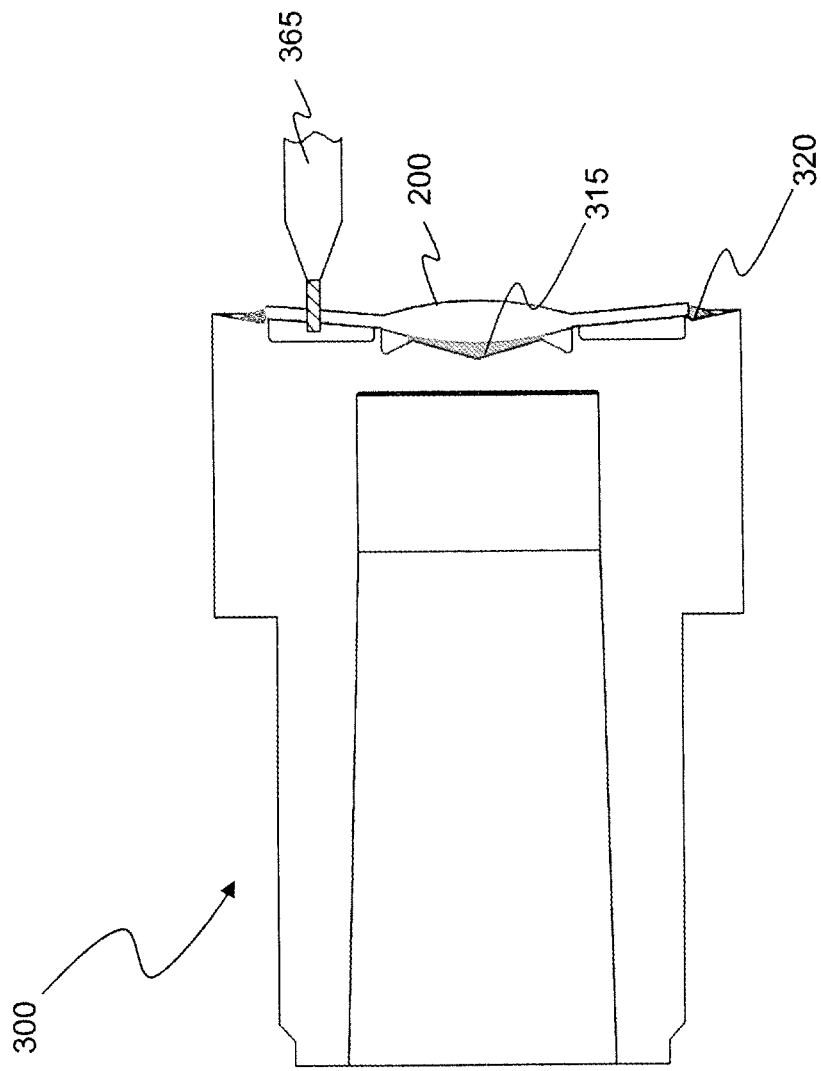

MANDREL FOR HOLDING AN INTRAOCULAR LENS BLANK AND METHOD OF MAKING AN INTRAOCULAR LENS USING THE SAME

CROSS-REFERENCE TO RELATED APPLICATIONS

This application claims the benefit of U.S. Provisional Application No. 61/815,663, filed on Apr. 24, 2013, the contents of which are hereby incorporated by reference in their entirety into the present disclosure.

BACKGROUND OF THE INVENTION

This invention relates to a method of making an intraocular lens, and more specifically, a method of making a one-piece intraocular lens.

Intraocular lenses are typically produced by machining and milling the device from a polymer disk that is held in place typically by wax or water (ice) during the fabrication process. Wax, either water soluble wax or solvent soluble wax, is used for fabricating hydrophilic intraocular lenses and ice is used when cryogenically fabricating hydrophobic intraocular lenses, which are rubbers at room temperature and require low temperatures for machining. Each side of the polymer blank is machined and milled in turn, with the final product being a completed single piece intraocular lens.

Typically the milling step, which forms a haptic of the intraocular lens, is performed with an end mill. The mill typically penetrates through the back surface of the machined haptic disk. This partially machined blank is typically held on a second-side mandrel using blocking wax when manufacturing hydrophilic intraocular lenses. Using this method, the wax used and the conditions of milling must be carefully selected in order to minimize adverse effects of the wax on the mill and haptic surface. Also, all swarf and wax must be cleared from the second side surface. Wax is needed to secure the partially fabricated part but also creates problems in the milled haptic, and reduces the tool life of the mill.

After milling, the intraocular lens is deblocked from the wax, which is typically done using solvent or water, depending on the type of wax. Water soluble wax can be problematic because it hydrates the intraocular lens in the presence of the dissolved wax impurities. Using known methods, wax residues must be separately removed from the intraocular lens. The portion of the haptic disk that does not become part of the intraocular lens must also be removed from the finished intraocular lens after deblocking. This is typically a manual process.

Therefore, a need exists for an improved second side mandrel and improvied methods of making intraocular lenses.

SUMMARY

A mandrel for holding an intraocular lens blank during manufacturing includes an intraocular lens holding section configured to hold an intraocular lens. The intraocular lens holding section includes a central cavity configured to hold a mounting material such that the mounting material contacts an optic of the intraocular lens blank when the intraocular lens blank is mounted on the mandrel, and a projection extending around a periphery of the central cavity, the projection having an outer wall and an inner wall, and the projection being configured such that an outer peripheral edge of the intraocular lens blank extends up to or beyond the projection when the intraocular lens blank is mounted on the mandrel.

A method of manufacturing an intraocular lens includes providing a mandrel comprising an intraocular lens holding section configured to hold an intraocular lens. The intraocular lens holding section includes a central cavity configured to hold a mounting material, and a projection extending around a periphery of the central cavity. The method further includes depositing a mounting material in the central cavity, and transferring an intraocular lens blank to the mandrel such that the mounting material in the central cavity contacts an optic of the intraocular lens blank and an outer peripheral edge of the intraocular lens blank extends up to or beyond the projection.

A method of making a mandrel for holding an intraocular lens blank during manufacturing comprises forming an intraocular lens holding section configured to hold an intraocular lens, the step of forming the intraocular lens holding section including: forming a central cavity configured to hold a mounting material such that the mounting material contacts an optic of the intraocular lens blank when the intraocular lens blank is mounted on the mandrel, and forming a projection extending around a periphery of the central cavity, the projection having an outer wall and an inner wall, and the projection being configured such that an outer peripheral edge of the intraocular lens blank extends up to or beyond the projection when the intraocular lens blank is mounted on the mandrel.

BRIEF DESCRIPTION OF THE DRAWINGS

The accompanying drawings, which are incorporated in and constitute a part of this specification, illustrate embodiments of the invention and together with the description serve to explain principles of the invention.

FIGS. 3(a)-3(c) show side, cross-sectional views of steps of a known method of machining and milling the second side of the partially machined blank, FIG. 3(a) showing the partially machined blank mounted in the second side mandrel, FIG. 3(b) showing a haptic being milled into the partially machined blank, and FIG. 3(c) showing the intraocular lens while still attached to the second side mandrel after machining, while FIG. 3(d) shows the finished intraocular lens after being deblocked from the second side mandrel, in both a side view (right) and top view (left).

FIG. 5(a) shows a side, cross-sectional view of an intraocular lens blank mounted on the mandrel of FIG. 4, and FIG. 5(b) a side, cross-sectional view of an intraocular lens blank mounted on the mandrel of FIG. 4, after the second side is machined.

FIG. 9(a) shows a side, cross-sectional view of an intraocular lens blank mounted on a mandrel of a second embodiment of the present invention, and FIG. 9(b) a side, cross-sectional view of an intraocular lens blank mounted on the mandrel of FIG. 9(a), after the second side is machined.

FIG. 10 shows a side, cross-sectional view of a step of milling an intraocular lens blank mounted on the mandrel of FIG. 8(a).

DETAILED DESCRIPTION OF THE PREFERRED EMBODIMENTS

Figure 1:
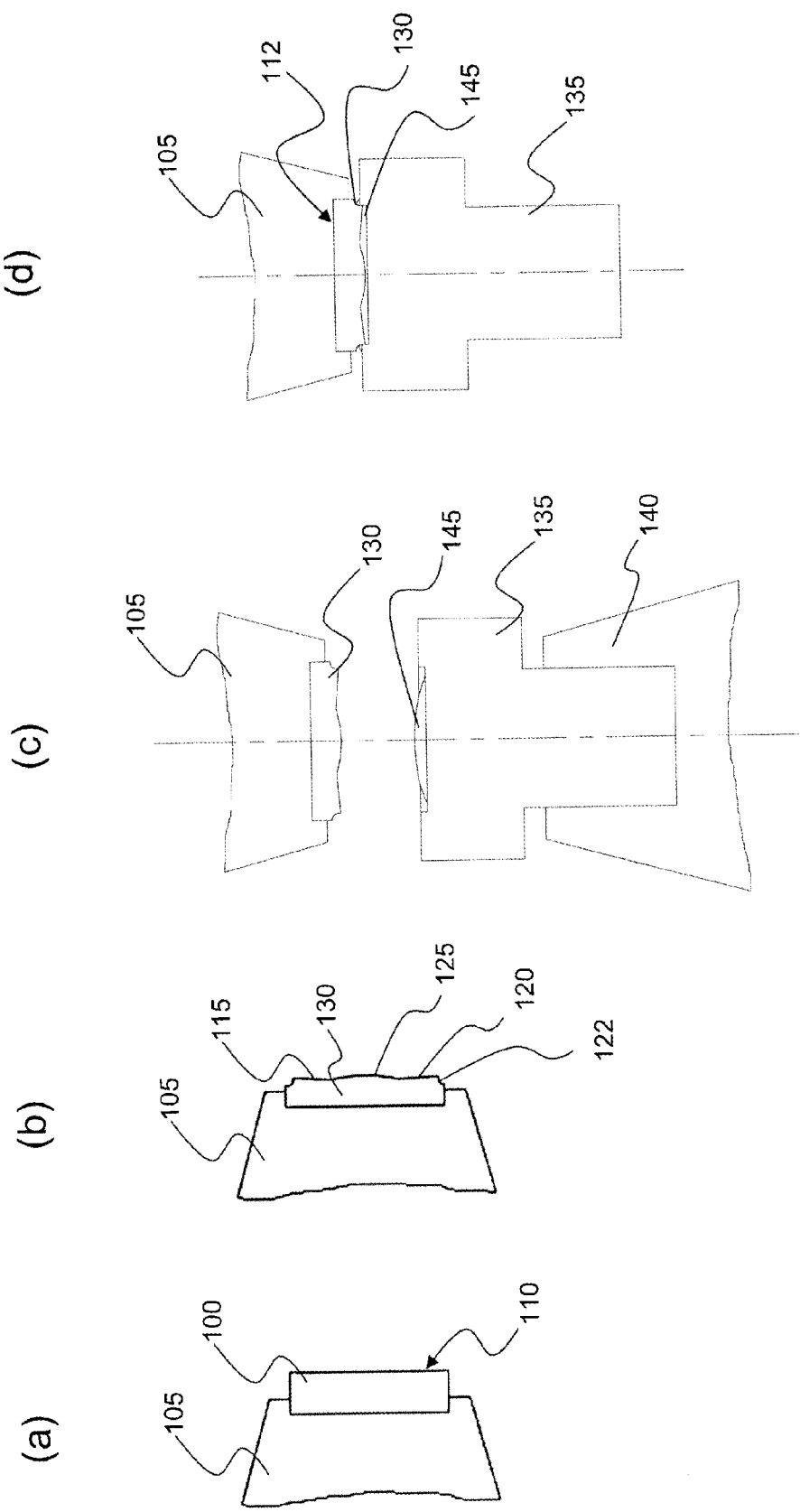
FIG. 1 shows side, cross-sectional views of steps of a known method of machining a first side of a blank, where the blank is held in a first side collet during first side machining, FIG. 1(a) showing the blank mounted in the first side collet, FIG. 1(b) showing the blank with alignment feature after machining while the blank is held in the first side collet, FIG. 1(c) showing the partially machined blank aligned above the second side mandrel, and FIG. 1(d) showing the partially machined blank being transferred to a second side mandrel.
Figure 2:
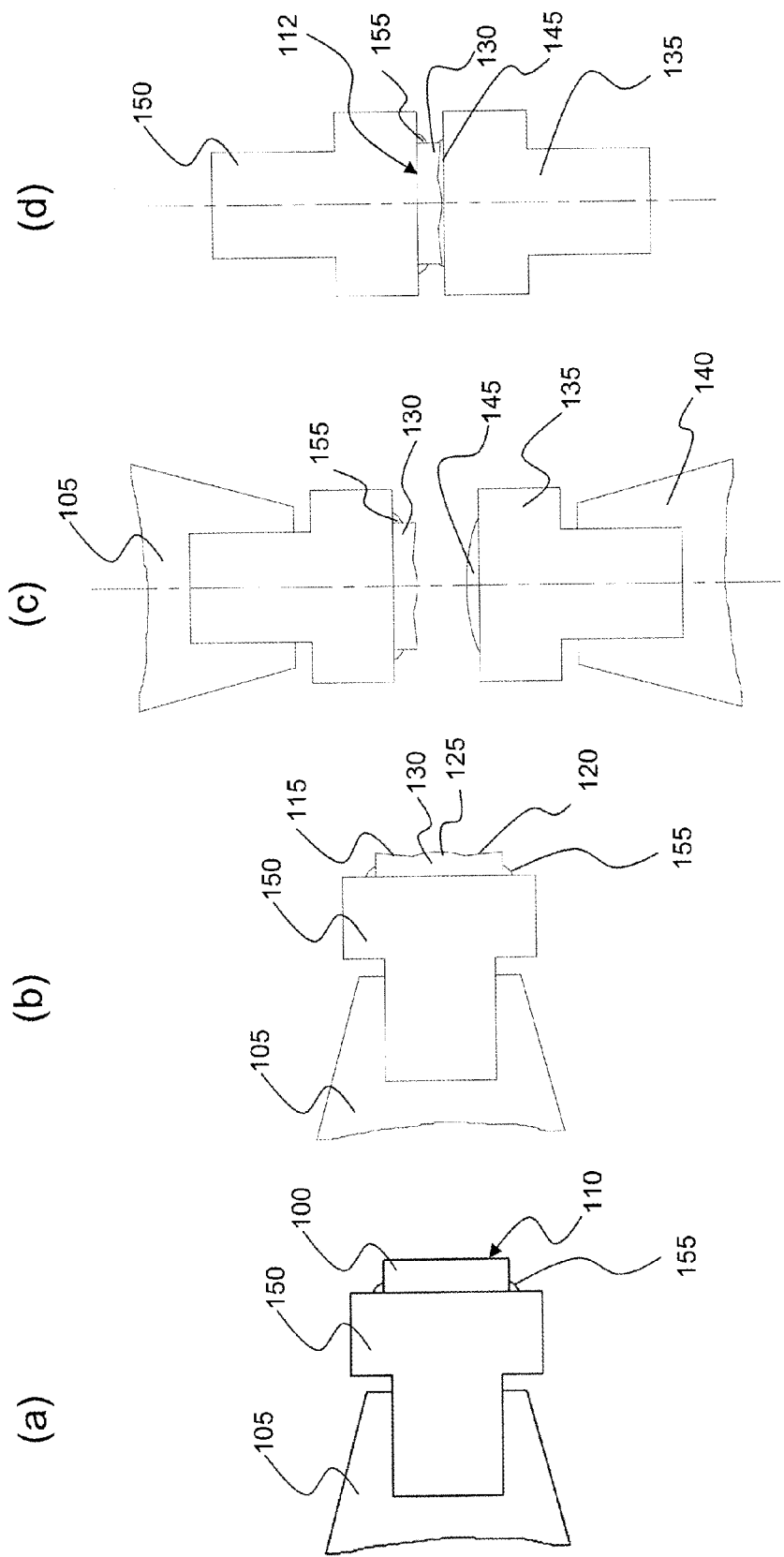
FIG. 2 shows side, cross-sectional views of steps of a known method of machining and milling a first side of a blank 100, where the blank is held using a first side mandrel during first side machining, FIG. 2(a) showing the blank mounted on the first side mandrel, FIG. 2(b) showing the blank after machining while the blank is held in the first side mandrel, FIG. 2(c) showing the first side mandrel and partially machined blank aligned above the second side mandrel, and FIG. 2(d) showing the partially machined blank being transferred to a second side mandrel.
Figure 3:
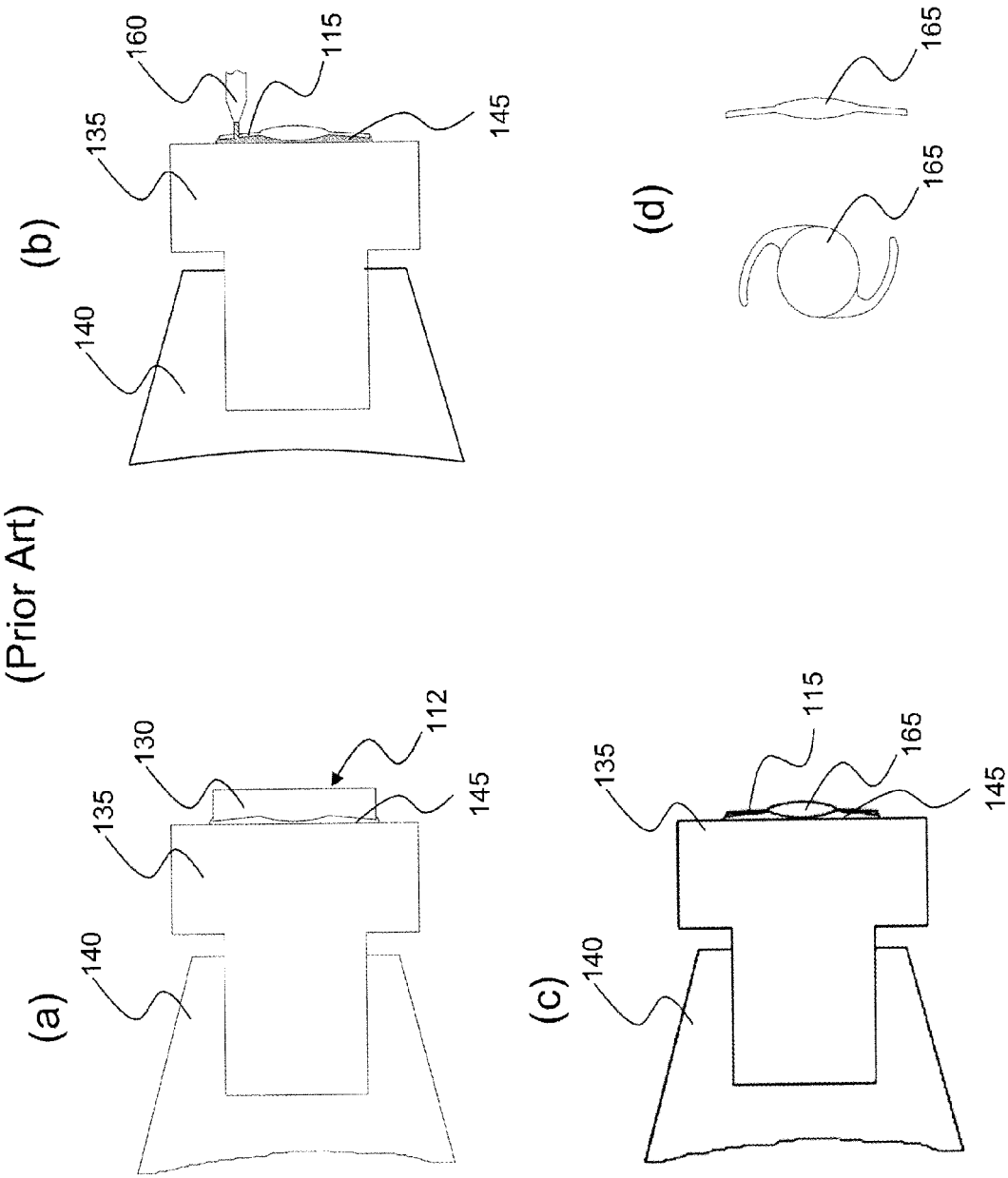

Examples of known processes used to manufacture a single piece intraocular lens are shown in FIGS. 1-3.

FIG. 1 depicts a known method of machining a first side of a blank 100, where the blank 100 is held in a first side collet 105 during first side machining. During the manufacturing of the first side 110, the haptic surface 115, angulation 120, and optic 125 are machined, as shown in FIG. 1(b). A feature 122 with a set diameter is machined into the outside edge of the partially machined blank 130. This feature 122 is used to mechanically center the partially machined blank 130 during transfer blocking to the second side mandrel for machining and milling of the second side, as shown in FIG. 1(c). The partially machined blank 130 is then transferred with wax to a second side mandrel 135 using a locating feature, which is held by a second side collet 140. The partially machined blank is held in place on the second side mandrel 135 by wax 145 (or ice in cryo machining), as shown in FIG. 1(d). For ease of viewing, the second side collet 140 is not shown in FIG. 1(d).

FIG. 2 depicts a known method of machining and milling a first side of a blank 100, where the blank 100 is held using a first side mandrel 150 during first side machining. In this embodiment, the first side mandrel is 150 is held by the first side collet 105, as shown in FIG. 2(a). The blank 100 is attached to the first side mandrel using wax 155 (or ice in cryo machining). During the manufacturing of the first side 110, the haptic surface 115, angulation 120, and optic 125 are machined, as shown in FIG. 2(b). The haptic shape can also be milled at this time or during the second side machining. The mandrel shank and mandrel height is used to mechanically position the partially machined blank 130 in a precision dead stop collet during transfer blocking to the second side mandrel, as shown in FIG. 2(c). A Z height is set by the mandrel height in the dead stop collet. The partially machined blank 130 is then transferred to a second side mandrel 135, which is held by a second side collet 140. The partially machined blank is held in place on the second side mandrel 135 by wax 145 (or ice in cryo machining), as shown in FIG. 2(d). For ease of viewing, the collets 105 and 140 are not shown in FIG. 2(d). Transfer using mandrels for alignment typically requires precision mandrels, precision collets, and precision collet alignment.

FIG. 3 shows steps of machining and milling the second side 112 of the partially machined blank 130. FIG. 3(a) shows a step of holding the partially machined blank 130 in the second side mandrel 135. FIG. 3(b) showing a step of milling a haptic surface 115 the partially machined blank using an end mill 160. Typically the milling step, which forms the haptic, is performed with a carbide or diamond end mill, the preferred method being to penetrate through the back surface of the machined haptic disk with the mill. FIG. 3(c) shows the intraocular lens 165 while still attached to the second side mandrel 135 after machining. FIG. 3(d) shows a step of removing the finished intraocular lens 165 from the second side mandrel 135.

As discussed above, these known methods have several problems. Therefore, a need exists for an improved second side mandrel and improved methods of making intraocular lenses.

Figure 4:
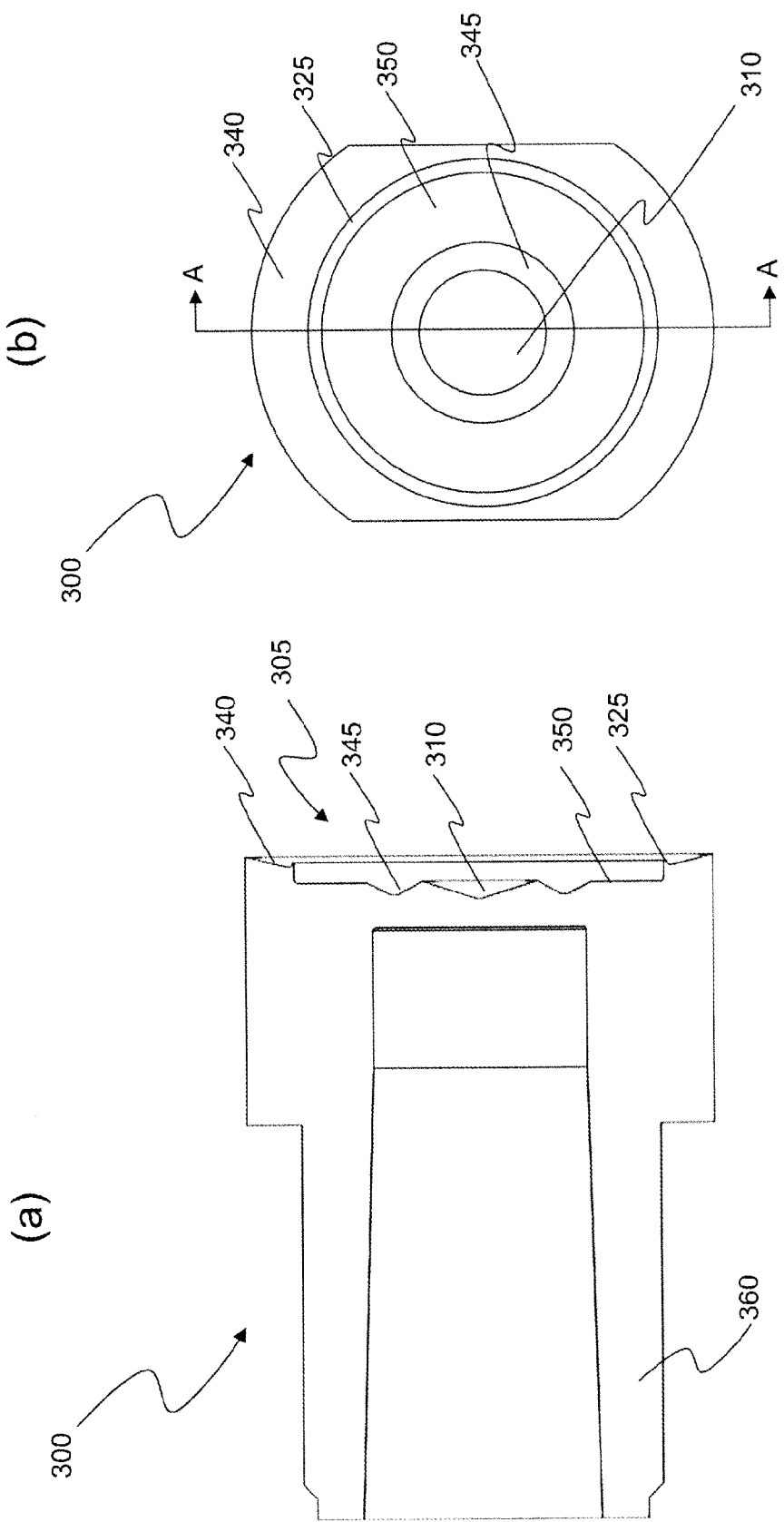
FIG. 4 shows a mandrel according to one embodiment of the present invention, FIG. 4(a) showing a side, cross-sectional view of the mandrel along the line A-A shown in FIG. 4(b), and FIG. 4(b) showing a top view of mandrel.

A mandrel according to a first embodiment of the present invention will be described with reference to FIGS. 4-8. FIG. 4 shows a mandrel 300 according to one embodiment of the present invention, FIG. 4(a) showing a side, cross-sectional view of the mandrel 300 along the line A-A shown in FIG. 4(b), and FIG. 4(b) showing a top view of mandrel 300.

The mandrel 300 is configured for holding an intraocular lens blank during manufacturing. Preferably, the mandrel 300 is a second-side mandrel, meaning that the mandrel 300 is a mandrel to which an intraocular lens blank is transferred from a first side collet 105 or a first side mandrel 150, after a first side of the intraocular lens blank is machined.

The mandrel 300 includes an intraocular lens holding section 305. The intraocular lens holding section 305 includes a central cavity 310. The central cavity 310 is configured to hold a mounting material, such as wax, such that the mounting material contacts an optic of the intraocular lens blank when the intraocular lens blank is mounted on the mandrel 300. The central cavity may be rounded, or may have a conical or truncated conical shape, as shown in FIG. 4A.

Figure 7:
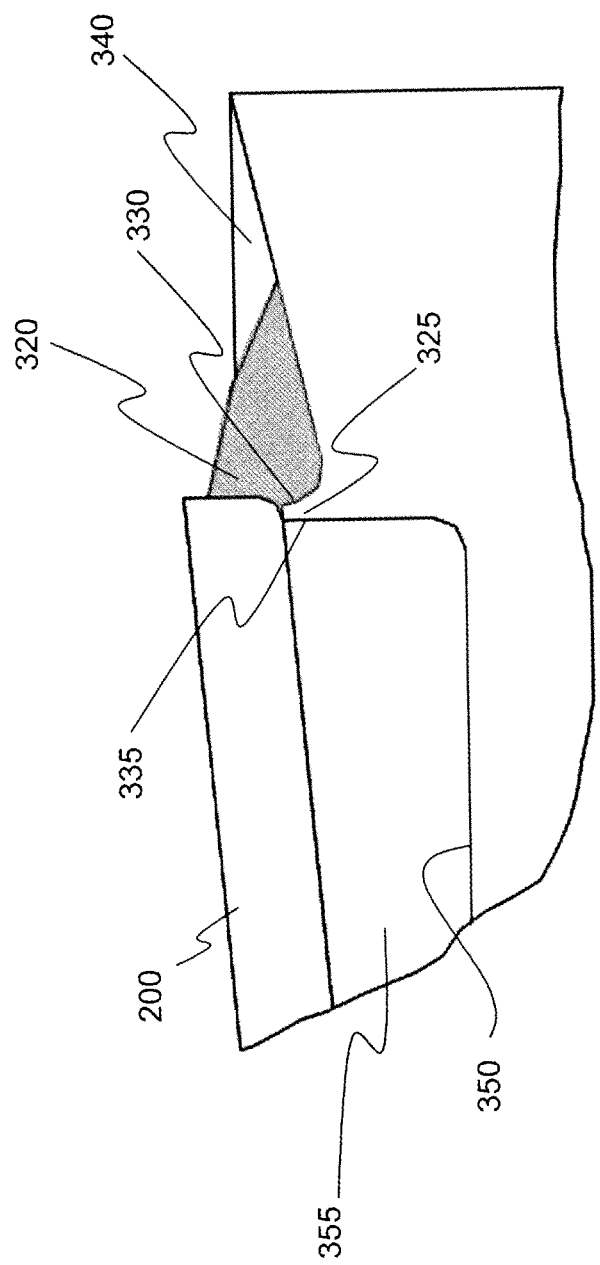
FIG. 7 shows a side, cross-sectional view of the portion 7 shown in FIG. 5(b), including a fillet of mounting material.
Figure 8:
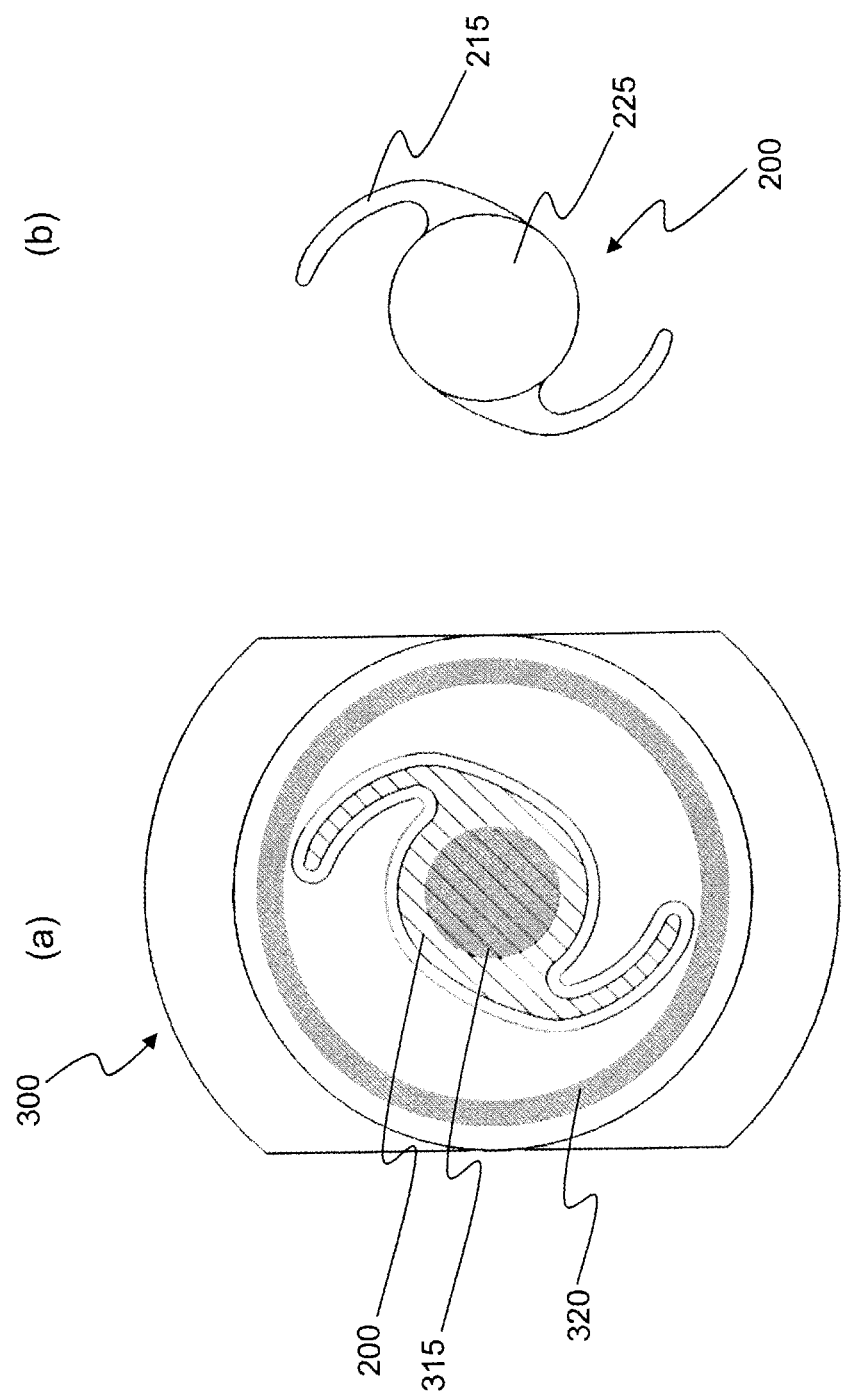
FIG. 8(a) shows a top view of the mandrel of FIG. 4, showing the locations of first and second mounting materials.
FIG. 8(b) shows a top view of a finished intraocular lens after being deblocked from the mandrel.

The intraocular lens holding section 305 of the mandrel 300 further includes a projection 325 extending around a periphery of the central cavity 310. The projection 325 may be, for example, a ring-shaped projection. The projection 325 includes an outer wall 330 and an inner wall 335, as shown in FIG. 7. The projection 325 is configured such that an outer peripheral edge of the intraocular lens blank extends up to or beyond the projection 325 when the intraocular lens blank is mounted on the mandrel 300. The projection 325 may be configured such that an outer peripheral edge of the intraocular lens blank extends up to or beyond the inner wall 335 of the projection 325 when the intraocular lens blank is mounted on the mandrel 300. Preferably, the projection 325 is configured such that an outer peripheral edge of the intraocular lens blank extends up to or beyond the outer wall 330 of the projection 325 when the intraocular lens blank is mounted on the mandrel 300. The projection 325 can act as a dead stop for blocking the intraocular lens. The projection 325 can be located a precisely controlled and constant distance from an end of the mandrel shank. This constant distance, and a constant thickness of the partly machined blank, can create a constant Z height of the part during blocking.

The intraocular lens holding section 305 of the mandrel 300 includes a first trench 340 located between the outer wall 330 of the projection 325 and an outer periphery of the mandrel 300. The trench 340 may be, for example, a ring-shaped trench. The trench 340 is configured to hold a second mounting material such that the second mounting material contacts the intraocular lens blank at a periphery of the intraocular lens blank when the intraocular lens blank is mounted on the mandrel 300.

The intraocular lens holding section 305 of the mandrel 300 includes a second trench 345 located between the periphery of the central cavity 310 and the inner wall of the projection 325. The second trench 345 may be, for example, a second ring-shaped trench. This second trench 345 can accept any excess mounting material that overflows from the central cavity 310.

The central cavity 310 and/or the second trench 345 may be formed in a recessed surface 350 of the intraocular lens holding section 305. Preferably, both the central cavity 310 and the second trench 345 are formed in the recessed surface 350 of the intraocular lens holding section 305.

The intraocular lens holding section 305 of the mandrel 300 is configured such that, when the intraocular lens blank is mounted on the intraocular lens holding section 305, a space 355 is formed between the inner wall 335 of the projection 325, the outer periphery of the central cavity 310, and a surface of the intraocular lens blank. The space 355 is preferably deep enough to allow an end mill to penetrate the first side haptic surface sufficiently to allow efficient milling and a high-quality milled surface.

The mandrel 300 includes a hollow mandrel shank 360 to allow for mechanical deblocking of the finished intraocular lens (preferably without solvents), by exposing the inner mandrel surface immediately under the intraocular lens to mechanical energy. For example, mechanical force may be applied to the inside surface of the mandrel 300, opposite the central cavity, in order to momentarily deform the surface of the central cavity 310 and cause the mounting material to release. A mechanical vibration probe can be used for this purpose.

The shank diameter is preferably precisely controlled (for example, ±<0.01 mm), as is the roundness of the shank (for example, ±<0.01 mm TIR).

A method of using the mandrel 300 will be described with reference to FIGS. 5-8.

First, a mandrel 300 is provided. The mandrel may be placed into a precision collet. The first side machined intraocular lens blank 200 is placed in a first side collet (i.e., upper collet). The blank 200 may be held directly by the first side collet, or may be held by a first side mandrel with the first side machined blank fixed by a mounting material, the first side mandrel being held by the upper blocking collet. The mounting material is not particularly limited, and may be, for example, a low melting point material such as wax. A transfer blocking apparatus may include, for example, two precision collets precisely aligned vertically on their centerlines. The upper collet is typically moved down to the lower collet by means of a precision Z axis mechanism during blocking.

A small amount of a first mounting material 315 is deposited in the central cavity 310. For example, an amount of mounting material 315 sufficient to cover the central 3-5 mm of a 6 mm optic may be placed in the central cavity 310. Before the mounting material cools, or after reheating, the blank 200 with its first side 205 machined is brought down to a dead stop against the first projection 325, as shown in FIG. 5(a). At this point, the mounting material 315 is in contact with, for example, 3-5 mm of the first side optic 225.

The two collets are held in position until the mounting material 315 cools, for example, for 3-5 seconds.

A second mounting material 320 is deposited in the first trench 340, as shown in FIG. 5(a) and FIG. 7. The second mounting material 320 is deposited such that the second mounting material 320 contacts the intraocular lens blank 200 at a periphery 230 of the intraocular lens blank 200. Preferably, the second mounting material 320 is deposited after the blank 200 is lowered onto the mandrel 300. The second mounting material 320 makes a small fillet that fixed a periphery 230 of the blank 200 to the mandrel 300. The second mounting material 320 may be deposited using a rotary table and a wax or glue applicator. The fillet formed by the second mounting material 320 prevents the blank from coming off the mandrel 300 during milling, and holds the remainder of the blank (waste) to the mandrel after the intraocular lens 235 is mechanically deblocked.

The second mounting material 320 may be the same material as the first mounting material 315 (e.g., wax). Alternatively, the second mounting material 320 may be a glue material, because the second mounting material does not contact portions of the blank 200 that will become the finished intraocular lens 235. If a glue is used as the second mounting material 320, the mandrel 300 may be made of plastic, so that it is disposable after a single use. If wax is used as the second mounting material 320, the mandrel 300 may be reused.

FIG. 8(a) shows a top view of the mandrel of FIG. 4, showing the locations of first and second mounting materials.

Figure 6:
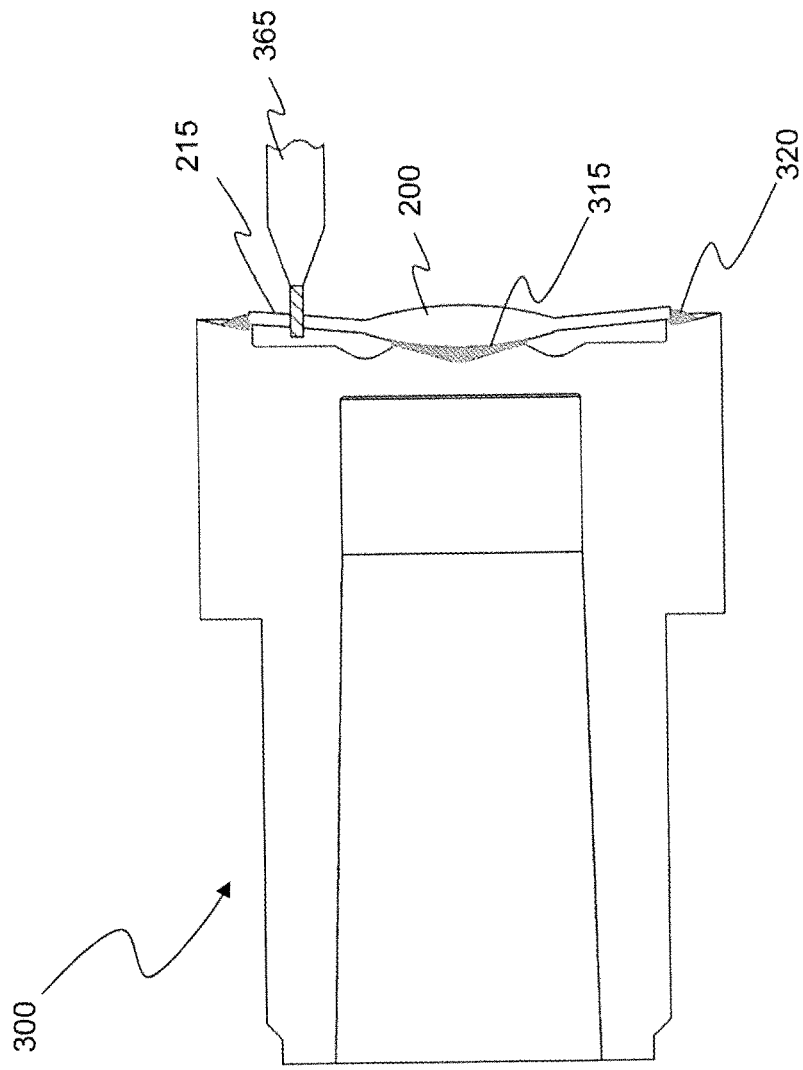
FIG. 6 shows a side, cross-sectional view of a step of milling an intraocular lens blank mounted on the mandrel of FIG. 4.

The second side 210 of the intraocular lens blank 200 is then machined, as shown in FIG. 5(b). Then, the haptic 215 is milled using, for example, an end mill 365, as shown in FIG. 6. The end mill 365 may be a carbide or diamond end mill.

After milling, the intraocular lens 235 is mechanically deblocked, for example, by exposing the inner mandrel surface of the hollow mandrel shank 360 immediately under the intraocular lens to mechanical energy. Preferably, deblocking is performed without the use of solvents. FIG. 8(b) shows a top view of a finished intraocular lens after being deblocked from the mandrel.

In another embodiment of the invention, the mandrel 300 further includes a second projection 900, as shown in FIGS. 9-10. The second projection may be, for example, a second ring-shaped projection. The second projection 900 can be formed so that it contacts the intraocular lens blank 200 at a periphery of the first side optic 225. The second projection 900 can provide additional support for blocking the intraocular lens 200, and prevent the intraocular lens 200 from bending during milling. It can also help to inhibit the first mounting material 310 from spreading to the space adjacent to the haptic surface, so that the end mill does not come into contact with the first mounting material during milling.

The method of using the mandrel 300 shown in FIGS. 9(a) and 9(b) is similar to that discussed above with respect to FIGS. 5(a) and 5(b), except that the blank 200 with its first side 205 machined is brought down to a dead stop against one or both of the first projection 325 and the second projection 900, as shown in FIG. 9(a).

The present invention is not limited to the embodiments disclosed above. The present invention can be implemented in a wide variety of configurations beyond those disclosed herein. Other embodiments of the invention will be apparent to those skilled in the art from consideration of the specification and practice of the invention disclosed herein. It is intended that the specification and examples be considered as exemplary only.

What is claimed is:

1. A method of making an intraocular lens, the method comprising:
providing a mandrel comprising an intraocular lens holding section configured to hold an intraocular lens, the intraocular lens holding section including:
a central cavity,
a first projection extending around a periphery of the central cavity, and
a first trench located between an outer wall of the first projection and an outer periphery of the mandrel;
depositing a first mounting material in the central cavity;
transferring an intraocular lens blank to the mandrel such that the first mounting material in the central cavity contacts an optic of the intraocular lens blank, an outer peripheral edge of the intraocular lens blank extends up to or beyond the first projection, and the first projection supports a periphery of the intraocular lens blank; and
depositing a second mounting material in the first trench such that the second mounting material contacts at least an outward-facing peripheral surface of the intraocular lens blank and fixes the intraocular lens blank to the mandrel, and such that the second mounting material is spaced from the first mounting material.

2. The method of claim 1,
wherein the intraocular lens holding section of the mandrel further comprises a second trench located between the periphery of the central cavity and the inner wall of the first projection.

3. The method of claim 2,
wherein the central cavity and the second trench are formed in a recessed surface of the intraocular lens holding section.

4. The method of claim 1, wherein the central cavity is formed in a recessed surface of the intraocular lens holding section.

5. The method of claim 1, wherein the intraocular lens blank is mounted on the intraocular lens holding section such that a space is formed between the inner wall of the first projection, the outer periphery of the central cavity, and a surface of the intraocular lens blank.

6. The method of claim 1,
wherein the intraocular lens holding section of the mandrel further comprises a second projection located between the first projection and the outer periphery of the central cavity, and
wherein the intraocular lens blank is transferred to the mandrel such that a surface of the intraocular lens blank contacts the second projection.

7. The method of claim 1,
wherein the intraocular lens holding section of the mandrel further comprises:
a second projection located between the first projection and the outer periphery of the central cavity, and
a second trench located between the periphery of the central cavity and an inner wall of the second projection, and
wherein the intraocular lens blank is transferred to the mandrel such that a surface of the intraocular lens blank contacts the second projection.

8. The method of claim 1, wherein a surface of the central cavity is configured such that the first mounting material sticks to the mandrel when the intraocular lens blank is removed from the mandrel.

9. The method of claim 1, wherein the mandrel further comprises a hollow mandrel shank.

10. The method of claim 1, further comprising, before transferring the intraocular lens blank to the mandrel, machining a first surface of the intraocular lens blank, wherein a surface of the intraocular lens blank that contacts the first mounting material is the machined surface of the intraocular lens blank.

11. The method of claim 10, further comprising, after transferring the intraocular lens blank to the mandrel, machining a second surface of the intraocular lens blank.

12. The method of claim 11, further comprising milling the intraocular lens blank to form a haptic of an intraocular lens.

13. The method of claim 12,
wherein the intraocular lens blank is mounted on the intraocular lens holding section such that a space is formed between the inner wall of the first projection, the outer periphery of the central cavity, and the machined first surface of the intraocular lens blank, and
wherein the milling is performed such that an end mill used in the milling step extends entirely through the intraocular lens blank and into the space formed between the inner wall of the first projection, the outer periphery of the central cavity, and the machined first surface of the intraocular lens blank.

14. The method of claim 13, wherein the milling is performed such that the end mill extends into the space without contacting the mandrel and without contacting the first and second mounting materials.

15. The method of claim 12, further comprising deblocking the intraocular lens such that the first and second mounting materials remain on the mandrel.

16. The method of claim 15,
wherein the deblocking is performing such that waste portions of the intraocular lens blank remain attached to the second mounting material.

17. The method of claim 12,
wherein the mandrel further comprises a hollow mandrel shank, and
wherein the method further comprises deblocking the intraocular lens by exposing an inner surface of the hollow mandrel shank to mechanical energy.

18. The method of claim 1, wherein an amount of the first mounting material deposited on the mandrel is selected such that, when the intraocular lens blank is transferred to the mandrel, the first mounting material contacts between 3 to 5 mm of the optic of the intraocular lens blank.

19. The method of claim 1, wherein the first mounting material comprises wax.

20. The method of claim 1,
wherein the first mounting material comprises wax, and
wherein the second mounting material comprises wax or glue.

21. The method of claim 1,
wherein the first mounting material comprises wax, and
wherein the second mounting material comprises glue.

22. The method of claim 1, wherein the mandrel is made of a metal material.

23. The method of claim 1, wherein the mandrel is made of a plastic material.

24. The method of claim 1,
wherein the second mounting material is deposited in the trench after transferring the intraocular lens blank to the mandrel.

25. The method of claim 1, wherein the central cavity has a conical or truncated conical shape.

26. The method of claim 1, wherein the first projection is ring-shaped.

27. The method of claim 1, wherein the first trench is a ring-shaped trench.

* * * * *